Figure 1:
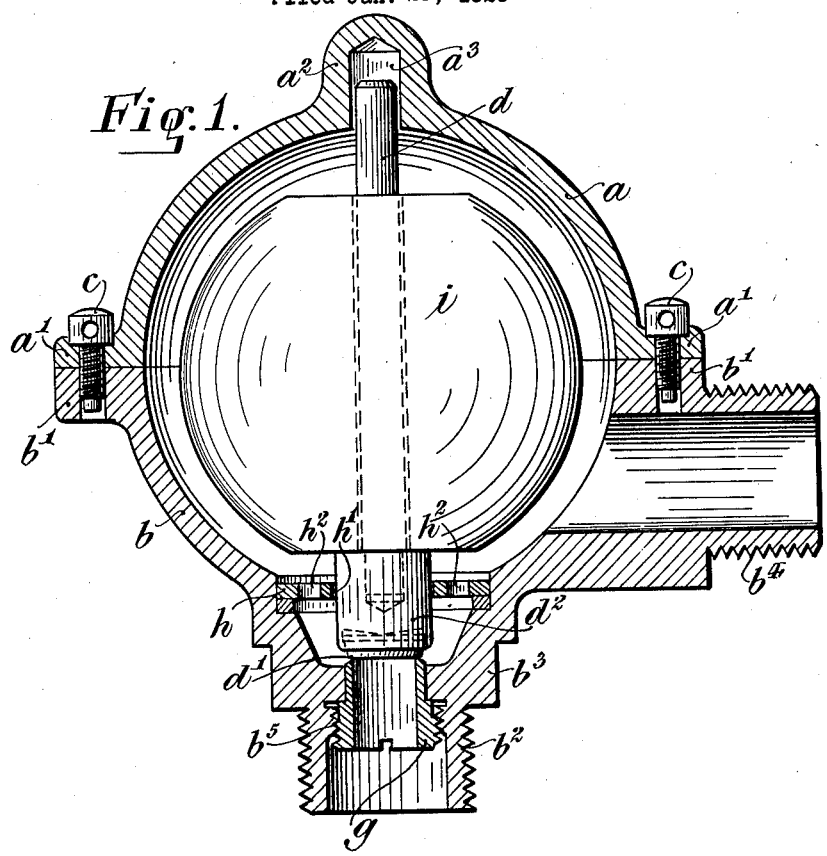
Figure 2:
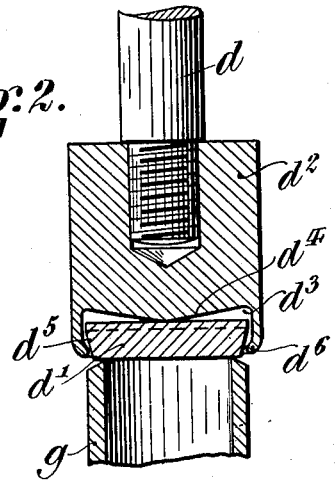

Aug. 31, 1926.

W. L. MARDEN

RELIEF VALVE

Filed Jan. 23, 1926

1,598,487

INVENTOR
William L. Marden
BY
Redding, Greeley, O'Shea Campbell
ATTORNEYS

Patented Aug. 31, 1926.

1,598,487

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

RELIEF VALVE.

Application filed January 23, 1926. Serial No. 83,221.

In Letters Patent of the United States No. 1,537,145, dated May 12, 1925, there is shown and described an improved relief valve, designed with special reference to its use in connection with domestic water-heating plants, to provide automatic relief if the pressure within the system increases within a predetermined limit, as sometimes happens if the normal return is choked in any way. To prevent possible waste of water, it is desirable, of course, that there shall be no leakage through the valve unless the condition which requires the relief valves to function arises. Extensive use of the relief valve referred to has shown that conditions may arise in which the valve does not close perfectly, and it is the object of the present invention to overcome this occasional difficulty and to improve the valve-seating arrangement so that the valve shall close perfectly under all conditions. In an application of the present applicant, Serial No. 16,881, filed March 20, 1925, there was shown and described a valve-seating arrangement which, at the time, was believed to satisfy the requirements of use, but practical use of that arrangement showed that it was not altogether satisfacory and resulted in the development of the present invention, by which the requirements of use are met more satisfactorily and the cost of production, in quantity, is considerably reduced. In accordance with the invention, the stem which carries the weight has threaded on its end a head which is recessed to receive a disc-like valve plug, the inner end of the recess being coned so that when the valve closes the disc-like plug may rock against the same and so conform to the annular valve seat, the edge of the recess being crimped after the plug is in place so as to engage the plug, which is preferably beveled for the purpose, and to retain it.

The invention will be more fully explained hereinafter with reference to the accompanying drawing, the single figure of which presents a view in sectional elevation of a relief valve which embodies the invention.

The casing of the valve, preferably approximately spherical in form, consists of an upper member $a$ and a lower member $b$, provided respectively with lugs $a^1$ and $b^1$ for the reception of screws $c$ by which the two members can be secured together. The upper member has an axial boss $a^2$ which is bored, as at $a^3$, to form a guide for one end of a valve stem $d$. The lower member $b$ has a threaded projection $b^2$ for engagement with the supply pipe and with a wrench grip $b^3$. A connection is formed at $b^4$ for the overflow pipe not shown. The bore of the projection $b^2$ is threaded as at $b^5$ to receive the bored valve seat $g$, preferably of Monel metal, formed with a knife-edge for co-action with the valve plug $d^1$, also preferably formed of Monel metal and so carried by the valve stem $d$ as to be easily secured in place and to be capable of rocking movement and therefore of conforming to the position of the valve seat $g$ and to seat perfectly thereon. For this purpose there is threaded on the lower end of the valve stem $d$ a head $d^2$ which is recessed, as at $d^3$, the inner end of the recess being coned, as shown at $d^4$, so that when the valve plug $d$ is seated in the recess it shall be capable of rocking on the coned surface and therefore of conforming to the position of the valve seat. In order that the valve plug shall be retained in place, but with freedom for rocking, as described, the valve plug is beveled slightly, as at $d^5$, and, after the valve plug has been placed in the recess, the edge of the recess is crimped slightly, as at $d^6$, so as to prevent the plug from falling out of the recess. This construction affords the desired freedom of movement for the valve plug, is not liable to trouble by reason of particles of solid matter setting between the plug and the walls of the recess, and can be produced with a minimum of labor and expense.

A guide plate $h$ is seated in the lower part of the chamber within the lower member $b$ of the casing and is provided with a central opening, as at $h^1$, to form a guide for the lower end of the valve stem and with other openings $h^2$ distributed about the central opening to give free vent to the inflowing water when the valve is unseated against the weight $i$ which is carried by the valve stem $d$.

I claim as my invention:

A relief valve comprising a casing to be connected to a supply line and provided with a waste outlet, an annular valve seat carried by the casing, a weighted valve stem guided in the casing, a head secured to the valve stem and formed at its lower extremity with a recess having a downwardly projecting cone at its upper end and a frusto-conical metallic disc-like valve plug seated in the recess of the head against the inwardly projecting cone, the wall of the recess of the head being crimped about the conical side of the plug to retain the same in place against the downwardly projecting cone but permitting the plug to be shifted angularly with respect to the axis of the head.

This specification signed this 19th day of January A. D. 1926.

WILLIAM L. MARDEN.